May 6, 1947.  P. W. ROSENFELD  2,420,097
ELECTRICALLY OPERATED WINDING MEANS FOR SPRING-ACTUATED CLOCKS
Filed Sept. 12, 1944
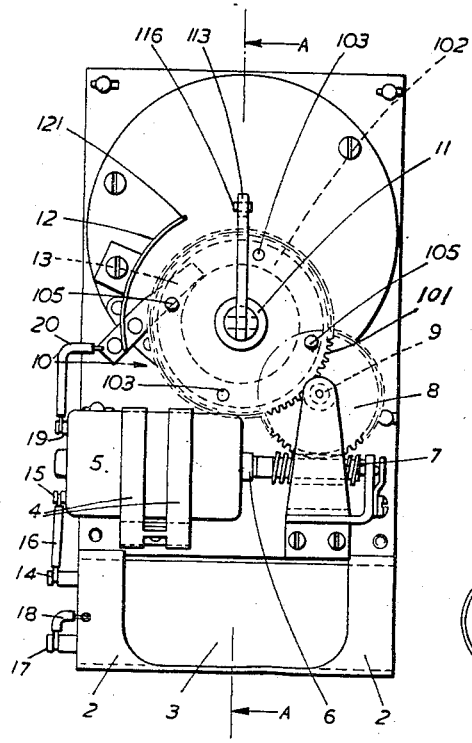
Inventor
Paul Waldemar ROSENFELD
By
his Attorney Patented May 6, 1947

2,420,097

UNITED STATES PATENT OFFICE 2,420,097

ELECTRICALLY OPERATED WINDING MEANS FOR SPRING-ACTUATED CLOCKS

Paul Waldemar Rosenfeld, London, England, assignor to Meridian Clock Co. (Gt. Britain) Limited, London E. C. 2, England, a British company Application September 12, 1944, Serial No. 553,696
In Great Britain September 25, 1943

20 Claims. (Cl. 185—40)

This invention relates to electrically operated winding means for spring-actuated clocks, the said winding means being operated by a weak-current electro-motor, which is driven, for example, by a battery or dry cell.

In winding means of this kind it is necessary to provide between the weak-current battery and the winding element for the spring a reducing gear and also a switch which, following a certain degree of movement on the part of the spring, switches on the motor to wind the spring and, after the spring has been wound to the requisite extent, again disconnects the motor automatically.

It is an object of the invention to provide a winding device of this character adapted to function periodically following a certain degree of relaxation on the part of the spring, wherein provision is made for exact connection and disconnection of the current by means of the switch.

A further object of the invention is to provide an electrically operated clock-winding means, in which the switch can also be employed as an ordinary manually operable winding means with entire disregard to the electrical drive.

A further object of the invention is to provide an arrangement of the character concerned, in which the switch together with the winding wheel can be applied to or disconnected from the spring arbor of the clock in ready and simple fashion in the form of a complete unit.

In the accomplishment of these and other objects, the invention accordingly resides in features of construction, combinations of elements, arrangements of parts and in the several steps and relation and order of each of the same to one or more of the others, all as will be illustratively described herein, and the scope of the application of which will be indicated in the appended claims.

In the accompanying drawings, wherein is shown one embodiment of the invention by way of example, Fig. 1 is a rear view of a clock fitted with winding means constructed according to the invention.

Fig. 2 is a side elevation, and

Fig. 3 illustrates a detail of Fig. 2 in section along the line A—A in Fig. 1 and drawn to a larger scale.

Referring now to the drawings, the clock mechanism 200 is mounted on an upright plate 1 to which a clip-like member 2 is attached for receiving a suitable source of electric current, for example an electric dry cell battery 3. By means of clips 4, an electric low voltage motor 5 is also attached to the plate 1. The shaft 6 of the motor 5 drives, by means of a worm 7, a spur-wheel 8 which, by means of a pinion 9, drives a winding wheel generally designated 10. The winding wheel 10 consists of a toothed disk 101 (see Fig. 3) of insulating material, a metal ring 102 attached to the rear of the disk 101, for example, by rivets 103 (Fig. 1), and a metal bushing 104 adapted to slide loosely over a neck portion 111 of a winding member generally denoted by numeral 11. The neck portion 111 is internally screw-threaded to engage the externally screw-threaded end 120 of the arbor of the clock spring. Thereby, the winding wheel 10 and the winding member 11 are secured to the spring arbor in such a manner that the winding member 11 rotates bodily with the spring arbor, while the winding wheel 10 may rotate relatively to the spring arbor.

It will be seen that the winding member 11 and the winding wheel 10 can readily be attached to or detached from the spring arbor, and in the latter event the clockwork is freely accessible. At its front the disk 101 is provided with two diametrically opposed studs 105, which pass through the disk 101 and are in electric contact with a slip ring 102 at the rear thereof. Each stud has an inclined surface 1051 at its top, as shown in Fig. 2. The winding member 11 comprises the neck portion 111 already referred to which merges into an enlarged and forked portion 112 within which is pivotally connected by the pivot 1121 an arm 113 having a finger 114 and a projection 115 carrying a roller 116, the finger 114 being so arranged on the arm 113 that it is able to contact the studs 105 on the disk 101 when the arm 113 is at right angles to the portion 112 and is rotated relatively to the disc 101. The inner end of the arm 113 is provided with a cam 117 against which a pin 118 presses under the action of a spring 119 (Fig. 3) to hold the arm in its position at right angles to the portion 112 or to return it into this position when slightly moved therefrom, but allowing the arm 113 to be brought into axial alignment with the portion 112 when it is desired to wind the clock manually. On the plate 1, an arcuate cam surface or ramp 12 (Figs. 1 and 2) is mounted to lie in the path of the roller 116 when the arm 113 is at right angles to the portion 112. Thus, when the arm 113 is rotated in an anti-clockwise direction the roller 116 will engage the end 12 (see Fig. 1) of the cam surface or ramp 12 and will ride on the cam or ramp edge, whereby the arm 113 will be slightly rocked around its pivot 1121 and its finger 114 consequently moved somewhat away from the disk 101 for a purpose more fully explained below.

A metal brush 13 is mounted on, but electrically insulated from, the plate 1 and bears resiliently against the ring 102. The terminal 14 of the battery 3 is connected to the terminal 15 of the motor 5 by means of the electric conductor 16. The terminal 17 of the battery 3 is connected to the metallic body of the clock which may be earthed, for example through a conductor 18 leading to the clip 2. The terminal 19 of the motor is connected through the conductor 20 to the brush 13.

The mechanism described operates as follows. As the spring of the clock unwinds, the winding member 11 and arm 113 are rotated by the spring arbor in a clockwise direction, while the winding wheel 10 is kept stationary by the worm 7 and spur wheel 8. With the arm 113 pivoted at right angles to the portion 112 as shown, the clockwise rotation of the member 11 and arm 113 continues until the finger 114 on arm 113 contacts with the stud 105 at the right hand side of Fig. 1, which closes the electric circuit for the motor 5, current flowing from terminal 17 of the battery 3 to the body of the clock, and thence through the winding member 11, the stud 105, to the ring 102, the brush 13, terminal 19 of the motor, through the motor and its terminal 15 to terminal 14 of the battery. The motor 5 is thus started and, through the worm 7, spur wheel 8 and pinion 9, rotates the winding wheel 10 in an anti-clockwise direction. The winding wheel 10, through its right-hand stud 105 bearing against the finger 114, drives the arm 113 and winding member 11 in the same direction, thereby turning the spring arbor to wind the spring. The winding continues until, by the roller 116 riding up the cam surface 12, the arm 113 is rocked sufficiently to disengage the finger 114 from the stud 105, thereby breaking the motor circuit and causing the motor 5 and winding wheel 10 to stop. The disengagement of the finger 114 from the stud 105 enables the clock spring to unwind again and return the winding member 11 in a clockwise direction until the finger 114 on its arm 113 contacts the other stud 105 which has been brought into its path at the right-hand side of Fig. 1 by the previous winding operation. Thereupon, the spring is wound again in the manner described. It will be understood that as the winding member 11 is returned clockwise by the unwinding of the spring, the roller 116 will ride down the cam surface 12 and the arm 113 rock back, under the action of spring 119, so as to restore the finger 114 to its initial position in readiness to contact the next stud 105 as described. The inclined tops 1051 of studs 105, as well as a similar inclined edge (not seen in the drawings) to the finger 114, are provided to facilitate the smooth return movement of the finger 114 over the stud 105 after disengagement therefrom.

It will also be apreciated that by reason of the pivotal mounting of the arm 113 on the winding member 11 as described, the arm 113 can be manually pivoted out of its described position for automatic electric winding, into a position where it is in axial alignment with the portion 112. By manually turning the arm 113 as a winding key, the clock spring can then be wound in conventional fashion by hand, with complete disregard to the electrical drive which is disconnected. The clock may thus be used, if desired, as an ordinary hand-wound spring-driven clock. It will also be apparent that the winding wheel 10 and winding member 11 are readily adapted to be fitted as an attachment to any existing hand-wound spring-driven clock, for conversion to electric winding by the means described.

Although a specific embodiment of the invention has been shown and described, it is to be understood that this is but illustrative and not exhaustive of the practical forms that the invention may take, since many modifications thereof will be apparent to those skilled in the art. Thus, for instance, whereas the winding wheel 10 has been shown and described as having two studs 105 placed at 180°, it will be evident that there may be employed a greater or lesser number of studs on that wheel to provide any desired time ratio between the winding and unwinding periods.

I claim:

1. In an electrically-wound spring-driven clock, the combination of a clock spring having a winding arbor, an electric motor, a winding wheel adapted to be driven by said motor, a rotatable winding member in driving connection with the arbor of the clock spring so as to wind the spring upon being rotated in one direction and so as to be rotated in the opposite direction as the spring unwinds, means forming an intermittent driving connection between said winding wheel and said winding member and comprising a contact abutment rotatable with said winding member and a contact stud on said winding wheel lying in the path of said contact abutment for engagement thereby, a motor energizing circuit wherein said stud and said abutment form a switch to close the motor circuit upon said abutment engaging said stud so that the then energized motor drives said winding wheel which in turn, through the driving connection constituted by said stud and abutment, drives said winding member to wind the spring, and means for disengaging said stud and abutment to stop the motor and allow the spring to unwind.

2. In an electrically-wound spring-driven clock, a clock spring having a winding arbor, a winding member mounted on the arbor of the clock spring so as to wind the spring upon being rotated in one direction and so as to be rotated in the opposite direction as the spring unwinds, a contact abutment rotatable with said winding member, a winding wheel mounted to be freely rotatable relatively to said winding member, a contact stud on said winding wheel in the path of said contact abutment so as to be engaged thereby after a predetermined unwinding of the spring, an electric motor in driving connection with said winding wheel, an energizing circuit for said motor, said circuit including said contact stud and contact abutment which together form a switch to close the motor circuit upon said engagement of said abutment with said stud, so that the then energized motor drives said winding wheel which in turn, through the engagement of said stud and abutment, drives said winding member to wind the spring, and means for disengaging said contact stud and contact abutment after a predetermined winding movement of said winding member, to stop said motor and allow the spring to unwind.

3. In an electrically-wound spring-driven clock, the combination of a clock spring having a winding arbor a contact abutment rotatable with the arbor of the clock spring, a winding wheel on the spring arbor and freely rotatable relatively thereto, an electric motor in driving connection with said wheel, a contact stud on said wheel lying in the path of said abutment, an energising circuit for said motor, said circuit including said stud and said abutment which together form a switch to close the motor circuit upon said abutment engaging said stud as the spring unwinds, whereby said motor is energised to drive said winding wheel in a direction for winding the spring, so that said wheel through the engagement of said stud and abutment rotates the spring arbor to wind the spring, and means for disengaging said contact stud and abutment after they have travelled together a predetermined distance, whereby to stop the motor and allow the spring to unwind.

4. In an electrically-wound spring-driven clock, the combination of a clock spring having a winding arbor, a contact abutment rotatable with the arbor of the clock spring and yieldable substantially normal to the plane of rotation, a winding wheel on the spring arbor and freely rotatable relatively thereto, an electric motor in driving connection with said wheel, a contact stud on said wheel lying in the path of said abutment, an energising circuit for said motor, said circuit including said stud and said abutment which together form a switch to close the motor circuit upon said abutment engaging said stud as the spring unwinds, whereby said motor is energised to drive said winding wheel in a direction for winding the spring, so that said wheel through the engagement of said stud and abutment rotates the spring arbor to wind the spring, and means for causing said abutment to yield and disengage from said stud after they have travelled together a predetermined distance, whereby to stop the motor and allow the spring to unwind.

5. In an electrically-wound spring-driven clock, a clock spring having a winding arbor a winding member mounted on the arbor of the clock spring so as to wind the spring upon being rotated in one direction and so as to be rotated in the opposite direction as the spring unwinds, a contact abutment rotatable with said winding member and yieldable substantially normal to the plane of rotation, a winding wheel mounted to be freely rotatable relatively to said winding member, a contact stud on said winding wheel in the path of said contact abutment so as to be engaged thereby after a predetermined unwinding of the spring, an electric motor in driving connection with said winding wheel, an energising circuit for said motor, said circuit including said contact stud and contact abutment which together form a switch to close the motor circuit upon said engagement of said abutment with said stud, so that the then energised motor drives said winding wheel which in turn, through the engagement of said stud and abutment, drives said winding member to wind the spring, and means causing said abutment to yield and disengage from said stud after a predetermined winding movement of said winding member, to stop said motor and allow the spring to unwind.

6. In an electrically-wound spring-driven clock, the combination of a clock spring having a winding arbor an arm rotatable with the arbor of the clock spring and rockable substantially normal to its plane of rotation, a contact abutment on said arm, a winding wheel on the spring arbor and freely rotatable relatively thereto, an electric motor in driving connection with said wheel, a contact stud on said wheel lying in the path of said abutment, an energising circuit for said motor, said circuit including said stud and said abutment which together form a switch to close the motor circuit upon said abutment engaging said stud as the spring unwinds, whereby said motor is energised to drive said winding wheel in a direction for winding the spring, so that said wheel through the engagement of said stud and abutment causes said arm to rotate the spring arbor to wind the spring, and means in the path of said arm for rocking the same to disengage said abutment from said stud after they have travelled together a predetermined distance, whereby to stop the motor and allow the spring to unwind.

7. In an electrically-wound spring-driven clock, a clock spring having a winding arbor, a winding member mounted on the arbor of the clock spring so as to wind the spring upon being rotated in one direction and so as to be rotated in the opposite direction as the spring unwinds, an arm on said winding member and rotatable therewith and rockable substantially normally to the plane of rotation, a contact abutment on said arm, a winding wheel mounted to be freely rotatable relatively to said winding member, a contact stud on said winding wheel in the path of said abutment so as to be engaged thereby after a predetermined unwinding of the spring, an electric motor in driving connection with said winding wheel, an energising circuit for said motor, said circuit including said stud and said abutment which together form a switch to close the motor circuit upon said engagement of said abutment with said stud, so that the then energised motor drives said winding wheel which in turn, through the engagement of said stud and abutment, causes said arm to drive said winding member to wind the spring, and means in the path of said arm for rocking the same to disengage said abutment from said stud after a predetermined winding movement of said winding member, to stop said motor and allow the spring to unwind.

8. In an electrically-wound spring-driven clock, the combination of a clock spring having a winding arbor, an arm rotatable with the arbor of the clock spring and rockable substantially normal to its plane of rotation, a contact abutment on said arm, a winding wheel on the spring arbor and freely rotatable relatively thereto, an electric motor in driving connection with said wheel, a contact stud on said wheel lying in the path of said abutment, an energising circuit for said motor, said circuit including said stud and said abutment which together form a switch to close the motor circuit upon said abutment engaging said stud as the spring unwinds, whereby said motor is energised to drive said winding wheel in a direction for winding the spring, so that said wheel through the engagement of said stud and abutment causes said arm to rotate the spring arbor to wind the spring, and a cam surface in the path of said arm to lift the same and thereby disengage said abutment from said stud after they have travelled together a predetermined distance, whereby to stop the motor and allow the spring to unwind.

9. In an electrically-wound spring-driven clock, a clock spring having a winding arbor, a winding member mounted on the arbor of the clock spring so as to wind the spring upon being rotated in one direction and so as to be rotated in the opposite direction as the spring unwinds, an arm on said winding member and rotatable therewith and rockable substantially normally to the plane of rotation, a contact abutment on said arm, a winding wheel mounted to be freely rotatable relatively to said winding member, a contact stud on said winding wheel in the path of said abutment so as to be engaged thereby after a predetermined unwinding of the spring, an electric motor in driving connection with said winding wheel, an energising circuit for said motor, said circuit including said stud and said abutment which together form a switch to close the motor circuit upon said engagement of said abutment with said stud, so that the then energised motor drives said winding wheel which in turn, through the engagement of said stud and abutment, causes said arm to drive said winding member to wind the spring, and a cam surface in the path of said arm to lift the same and thereby disengage said abutment from said stud after a predetermined winding movement of said winding member, to stop said motor and allow the spring to unwind.

10. As an article of manufacture, an electric winding attachment for a spring-driven clock, including a winding key having a stem adapted for securing to the arbor of the clock spring and having an arm pivoted on said stem so as to be movable between a position substantially in alignment with said stem and a position substantially perpendicular to said stem, a toothed wheel of insulating material freely rotatable on said stem, a slip ring on said wheel, a contact stud connected to said ring and projecting from said wheel, spring means on said key for yieldably holding said arm in each of its said positions, and a contact abutment positioned on said arm for engaging said stud when said arm is rotated in its second mentioned position aforesaid.

11. As an article of manufacture, an electric winding attachment for a spring-driven clock, including a metal winding key having a stem adapted at one end for securing to the arbor of the clock spring and having a metal arm pivoted to the other end of said stem so as to be movable between a position substantially in alignment with said stem and a position substantially perpendicular to said stem, spring means on said stem for yieldably holding said arm in each of its said positions, a toothed wheel of insulating material freely rotatable on said stem, a slip ring on the side of said wheel remote from said arm, a contact stud connected to said ring and projecting from the side of said wheel facing said arm, a contact abutment projecting laterally from said arm at a point therealong so as to engage said stud when said key is rotated with said arm in its second mentioned position aforesaid, said arm being longer than the radius of said wheel, and a cam projection at the outer end of said arm.

12. The combination as defined in claim 6, in which said arm is rockable substantially into alignment with the spring arbor for manually winding the spring.

13. The combination as defined in claim 7, in which said arm is rockable substantially into alignment with the spring arbor for manually winding the spring.

14. The combination as defined in claim 8, in which said arm is rockable substantially into alignment with the spring arbor for manually wnding the spring.

15. The combination as defined in claim 9, in which said arm is rockable substantially into alignment with the spring arbor for manually winding the spring.

16. In an electrically-wound spring-driven clock, a clock spring having a winding arbor, a winding member mounted on the arbor of the clock spring so as to wind the spring upon being rotated in one direction and so as to be rotated in the opposite direction as the spring unwinds, a contact abutment rotatable with said winding member, a winding wheel mounted to be freely rotatable relatively to said winding member, a contact stud on said winding wheel in the path of said contact abutment so as to be engaged thereby after a predetermined unwinding of the spring, a weak-current low-voltage electric motor in driving connection with said winding wheel, an energising circuit for said motor, said circuit including a weak-current low-voltage source and also including said contact stud and contact abutment which together form a switch to close the motor circuit upon said engagement of said abutment with said stud, so that the then energised motor drives said winding wheel which in turn, through the engagement of said stud and abutment, drives said winding member to wind the spring, and means for disengaging said contact stud and contact abutment after a predetermined winding movement of said winding member, to stop said motor and allow the spring to unwind.

17. The combination as defined in claim 16, in which said weak-current low-voltage source is an electric dry cell battery.

18. In an electrically-wound spring-driven clock, a support, a clockwork mechanism including a clock spring having a winding arbor carried by said support, a contact abutment rotatable with said arbor, a winding wheel freely rotatable on said arbor, a weak-current low-voltage electric motor mounted on said support and in driving connection with said wheel, a contact stud on said wheel lying in the path of said abutment, means attached to said support for holding an electric dry battery, conductor means adapted to form with said battery an energising circuit for said motor, said circuit including said stud and said abutment which together form a switch to close the motor circuit upon said abutment engaging said stud as the spring unwinds, whereby said motor is energised to drive said winding wheel in a direction for winding said spring, so that said wheel through the engagement of said stud and abutment rotates said arbor to wind said spring, and means carried by said support for disengaging said contact stud and abutment after they have travelled together a predetermined distance, whereby to stop the motor and allow the spring to unwind.

19. In an electrically-wound spring-driven clock, the combination of a support, clockwork mechanism including a clock spring having a winding arbor mounted on said support, a winding member mounted on said arbor so as to wind said spring upon being rotated in one direction and so as to be rotated in the opposite direction as the spring unwinds, an arm on said winding member and rotatable therewith and rockable substantially normally to the plane of rotation, a contact abutment on said arm, a winding wheel freely rotatable on said arbor, a contact stud on said wheel lying in the path of said abutment so as to be engaged thereby after a predetermined unwinding of the spring, a weak-current low-voltage electric motor mounted on said support and in driving connection with said wheel, means carried by said support for holding an electric dry battery, means adapted to form with said battery an energising circuit for said motor, said circuit including said stud and said abutment which together form a switch to close the motor circuit upon said engagement of said abutment with said stud, so that the then energised motor drives said winding wheel which in turn, through the engagement of said stud and abutment, causes said arm to drive said winding member to wind the spring, and a cam surface caried by said support in the path of said arm to lift the same and thereby disengage said abutment from said stud after a predetermined winding movement of said winding member, to stop said motor and allow the spring to wind.

20. The combination defined in claim 19, in which said arm is articulated to said winding member and is movable between one position, in which said abutment cooperates with said stud and said arm cooperates with said cam surface for controlling the operation of said motor, and another position in which said arm is rotatable clear of said cam surface and with said abutment on said arm clear of said stud, to render said motor inoperative and permit manual rotation of said arm for manually winding said spring, and further comprising means for locating said arm in each of its said positions.

PAUL WALDEMAR ROSENFELD.

REFERENCES CITED

The following references are of record in the file of this patent:

UNITED STATES PATENTS

| Number | Name | Date |
|---|---|---|
| 1,301,499 | Pons | Apr. 22, 1919 |
| 781,072 | Hight | Jan. 31, 1905 |
| 1,193,012 | Goodson | Aug. 1, 1916 |
| 1,733,689 | Lux | Oct. 29, 1929 |